United States Patent
Baliguet et al.

(10) Patent No.: US 9,488,745 B2
(45) Date of Patent: Nov. 8, 2016

(54) METHOD FOR ESTIMATING THE WATER SPEED OF AN ACOUSTIC NODE

(71) Applicant: SERCEL, Carquefou (FR)

(72) Inventors: Pierre Baliguet, Nantes (FR); Christophe L'Her, Loperhet (FR)

(73) Assignee: SERCEL, Carquefou (FR)

( * ) Notice: Subject to any disclaimer, the term of this patent is extended or adjusted under 35 U.S.C. 154(b) by 640 days.

(21) Appl. No.: 13/950,015

(22) Filed: Jul. 24, 2013

(65) Prior Publication Data

US 2014/0029376 A1   Jan. 30, 2014

(30) Foreign Application Priority Data

Jul. 26, 2012   (EP) .................................... 12305915

(51) Int. Cl.
*G01V 1/38*   (2006.01)
*G01S 15/50*   (2006.01)

(52) U.S. Cl.
CPC .................. *G01V 1/38* (2013.01); *G01S 15/50* (2013.01); *G01V 1/3817* (2013.01)

(58) Field of Classification Search
CPC ....... G01V 1/38; G01V 1/3817; G01S 15/50
See application file for complete search history.

(56) References Cited

U.S. PATENT DOCUMENTS

| | | | | |
|---|---|---|---|---|
| 3,222,926 A * | 12/1965 | Carver | ................ | B64D 43/02 367/89 |
| 3,782,193 A * | 1/1974 | Meyer | ................ | G01P 5/245 73/181 |
| 3,949,605 A * | 4/1976 | Stallworth | ............. | G01F 1/667 367/128 |
| 4,232,380 A | 11/1980 | Caron et al. | | |
| 4,726,315 A * | 2/1988 | Bell | ................ | G01V 1/3843 114/244 |
| 2007/0230268 A1* | 10/2007 | Hoogeveen | ............... | G01S 5/22 367/19 |
| 2009/0007625 A1* | 1/2009 | Ao | ................ | G01F 25/0007 73/1.31 |
| 2009/0097355 A1* | 4/2009 | Clement | ............. | G01V 1/3835 367/19 |

FOREIGN PATENT DOCUMENTS

| | | |
|---|---|---|
| EP | 2541283 A1 | 1/2013 |
| WO | 2011014071 A2 | 2/2011 |
| WO | 2011089449 A2 | 7/2011 |

OTHER PUBLICATIONS

European Search Report and Written Opinion dated Jan. 11, 2013 for corresponding European Application No. 12305915.6, filed Jul. 26, 2012.

* cited by examiner

*Primary Examiner* — Isam Alsomiri
*Assistant Examiner* — Hovhannes Baghdasaryan
(74) *Attorney, Agent, or Firm* — David D. Brush; Westman Champlin & Koehler, P.A.

(57) ABSTRACT

A method and apparatus are provided for estimating the water speed of a first acoustic node D belonging to a network of acoustic nodes, at least some of the acoustic nodes being arranged along towed acoustic linear antennas (S). The method includes steps of: a) defining a N-dimensional base, the center of which is the first acoustic node and comprising a single axis, when N=1, or N non-collinear axes, when N=2 or N=3, each axis being associated with a base vector extending from the first acoustic node to another acoustic node; and b) estimating an amplitude of the water speed, as a function of: for each given other acoustic node defining the base vector: an acoustic propagation duration of an acoustic signal transmitted from the first acoustic node to the given other acoustic node, and an acoustic propagation duration of an acoustic signal transmitted from the given other acoustic nodes to the first acoustic node; and a value c of the underwater acoustic sound velocity.

16 Claims, 3 Drawing Sheets

METHOD FOR ESTIMATING THE WATER SPEED OF AN ACOUSTIC NODE

1. FIELD OF THE DISCLOSURE

The field of the disclosure is the acquisition of geophysics data. It deals with the equipments required in order to study the sea bed and its sediment layers properties.

More specifically, the disclosure pertains to a technique for estimating the water speed of a streamer, a paravane, or more generally any device towed by a vessel. The water speed of a device is the relative velocity of this device through water.

The disclosure can be applied notably to the oil prospecting industry using seismic method (sea oil survey), but can be of interest for any other field which requires a system performing geophysics data acquisition in a marine environment.

2. TECHNOLOGICAL BACKGROUND

It is sought more particularly here below in this document to describe problems existing in the field of seismic data acquisition for oil prospecting industry. The present disclosure of course is not limited to this particular field of application but is of interest for any technique that has to cope with closely related or similar issues and problems.

The operations of acquiring seismic data on site conventionally use networks of seismic sensors, like accelerometers, geophones or hydrophones. In a context of seismic data acquisition in a marine environment, these sensors are distributed along cables in order to form linear acoustic antennas normally referred to as "streamers" or "seismic streamers". As shown in FIG. 1, several streamers S1-S4 in parallel form a network of seismic streamers which is towed by a seismic vessel V.

The seismic method is based on analysis of reflected seismic waves. Thus, to collect geophysical data in a marine environment, one or more submerged seismic sources are activated in order to propagate omni-directional seismic wave trains. The pressure wave generated by the seismic sources passes through the column of water and insonifies the different layers of the sea bed. Part of the seismic waves (i.e. acoustic signals) reflected are then detected by the hydrophones distributed over the length of the seismic streamers. These seismic acoustic signals are processed and retransmitted by telemetry from the seismic streamers to the operator station situated on the seismic vessel, where the processing of the raw data is carried out (in an alternative solution, the seismic acoustic signals are stored for a later processing).

During seismic surveys, it is important to precisely locate the streamers in particular for:

monitoring the position of the hydrophones (distributed along the seismic streamers) in order to obtain a satisfactory precision of the image of the sea bed in the exploration zone;

detecting the movements of the streamers with respect to one another (the streamers are often subjected to various external natural constrains of variable magnitude, such as the wind, waves, currents); and monitoring the navigation of streamers, in particular in a situation of bypassing an obstacle (such as an oil barge).

This function is ensured by the acoustic positioning system, which comprise acoustic nodes, arranged along the streamers (they are regularly plugged externally or inline to the streamers), and a master controller system.

As also shown in FIG. 1, paravanes (or "doors") P1-P2 are hydrodynamic foils which are disposed laterally outwardly on each side of the plurality of streamers S1-S4, and allow to maintain lateral separation between adjacent streamers.

We detail now which it is important to know the paravane's water speed and the outer streamers' water speed.

Traditionally, seismic vessels sail in a straight line over a target, then turning back to shoot another line parallel to the first line. A well-known problem is to monitor in turn the drag force of the paravane which is external to the turn. The drag force has to be compatible with the rigging specifications, i.e. with the main line of the paravane handling system. Another problem is to monitor in turn the lateral force produced by the paravane which is internal to the turn. If the lateral force is too low, then the lateral separation between streamers may not be sufficient. The lateral force and the drag force mainly depend on the vessel water speed, the turn radius and the lateral separation between the paravane and the vessel.

Actually, the lateral force and the drag force are monitored with two independent measures, the towing rope tension of the paravane and the outer streamers water-speed. A high threshold on the towing rope tension ensures that the drag force of the paravane is acceptable and a low threshold ensures that the lateral force generated by the paravane is sufficient to maintain a lateral separation between adjacent streamers.

Some paravanes used in operation have foils with a height of 10 m, suspended below cylindrical floats more than 9 m in length. It is recurrent that object like tree's branch or trunk are caught by the paravanes, increasing significantly the drag force. In that case the water speed of the paravane allows to check coherence of the tension measurement and can permit to determine if a high tension is caused by an object caught by the paravane. In other words, in addition to the towing rope tension measurement, the paravane's water speed has to be known in order to identify the cause of a high tension value. Indeed, in addition to the vessel water speed, to the turn radius and to the lateral separation of the paravane, an object caught by the paravane may increase significantly the drag force.

As well, it cannot be assumed that the paravane's lateral force is always proportional to the tension on the paravane's towing rope. This is the case in ideal conditions, but some events may alter this hypothesis. For example a low lateral force may be hidden by an object caught by the paravane. In that case the paravane's water-speed is not affected and still traduces the lateral force applied by the door.

The paravane's water speed is traditionally measured by a battery powered instrument, called "speedlog", which is plugged on the outer streamers, close to the paravane.

A drawback of this specific measure instrument is that it requires a regular maintenance, in order to change the batteries, to clean the sensor and to check the calibration.

Another drawback of this specific measure instrument is that, when it is used to measure the water speed of a streamer, it only gives the water-speed in one axis, the streamer axis. So it cannot be used for predicting the streamers distortion, which is useful for managing the streamer network shape. Actually, the streamer distortion is mainly estimated with a current meter placed on the vessel's hull, also call ADCP (Acoustic Doppler Current Profiler), and a predictive algorithm which allows to estimate the current which will be seen by the streamer when it will reach the vessel position. The longer are the streamers, the worst are the current predictions at the streamer's tails because of the time which separates the ADCP measure and the time at which the streamer will be at the ADCP position of the measure.

3. SUMMARY

A particular embodiment of the invention proposes a method for estimating the water speed of a first acoustic node D belonging to a network of acoustic nodes, at least some of said acoustic nodes being arranged along towed acoustic linear antennas. This method for estimating the water speed comprises steps of:
a) defining a N-dimensional base, the center of which is said first acoustic node and comprising a single axis, when N=1, or N non-collinear axes, when N=2 or N=3, each said axis being associated with a base vector extending from said first acoustic node to another acoustic node;
b) estimating an amplitude of the water speed, as a function of:
   for each given other acoustic node defining a said base vector: an acoustic propagation duration of an acoustic signal transmitted from the first acoustic node to the given other acoustic node, and an acoustic propagation duration of an acoustic signal transmitted from the given other acoustic nodes to the first acoustic node;
   a value c of the underwater acoustic sound velocity.

Thus, this particular embodiment relies on a wholly novel and inventive approach based on an astute use of the acoustic nodes, for a new function (estimating water speed), in addition to their primary function (acoustic positioning system).

The estimated value of the water speed of a first acoustic node D can be used as an estimated value of the water speed of a device, in particular a streamer or a paravane (but other devices can be envisaged without departing from the scope of the present invention) which includes the node D or is close to the node D.

In other words, in the particular case of the water speed of a paravane, it is possible to use a node D which is comprised in the paravane, or a node D which is close to the paravane (e.g. the node D is the acoustic node closest to the paravane, among the acoustic nodes comprised in the streamers).

This method does not require any specific measure equipment to estimate the water-speed. Therefore, it eliminates the need for maintenance of such specific measure equipment.

Moreover, this method allows to estimate the water speed on the whole spread (i.e. in any point of the streamer network).

According to a particular feature, for each said axis associated with a said base vector extending from said first acoustic node D, to another acoustic node, generically noted X, step b) comprises estimating an amplitude $\|\overrightarrow{SP_{DX}}\|$ of a projection of the water speed on said axis, as a function of:
   an acoustic propagation duration $t_{DX}$ of an acoustic signal transmitted from the first acoustic node D to the other acoustic node X;
   an acoustic propagation duration $t_{XD}$ of an acoustic signal transmitted from the other acoustic node X to the first acoustic node D;
   said value c of the underwater acoustic sound velocity.

Thus, N estimated amplitude, corresponding to N projections of the water speed (each on a different axis), are obtained.

According to a particular feature, the amplitude $\|\overrightarrow{SP_{DX}}\|$ estimated according to the following formula:

$$\|\overrightarrow{SP_{DX}}\| = \frac{c(t_{DX} - t_{XD})}{t_{DX} + t_{XD}}$$

Thus, the computing is easy to carry out.
According to a particular feature, when N=2 or N=3, step b) comprises:
   obtaining the direction of each of the N axes;
   estimating the amplitude and N−1 orientation angle(s) of the water speed, as a function of:
      the directions of the N axes; and
      for each of the N axes, the estimated amplitude of the projection of the water speed on said axis.

Thus, with a two-dimensional base or a three-dimensional base, it is possible to estimate not only the amplitude of the water speed, but also its direction (given by N−1 orientation angle(s)). To allow this, the knowledge of the directions of the N axes is needed: these directions can be either estimated (i.e. computed), as detailed below, or be predetermined (e.g. be deduced from the acoustic node network layout).

According to a particular feature, N=2 and step a) comprises defining a two-dimensional base comprising first and second non-collinear axes, the first axis being associated with a first base vector extending from said first acoustic node to a second acoustic node A, the second axis being associated with a second base vector extending from said first acoustic node to a third acoustic node C, the second and third acoustic nodes being arranged along a first acoustic linear antenna. Moreover step b) comprises estimating, in the plan comprising the first, second and third acoustic nodes, an amplitude $\|\overrightarrow{WSP_D}\|$ and an orientation angle $\gamma$, per comparison to an axis of said first acoustic linear antenna, of the water speed, by solving the following system of two equations:

$$\|\overrightarrow{WSP_D}\| = \frac{c(t_{DA} - t_{AD})}{(t_{DA} + t_{AD})\sin(\alpha + \gamma)} \text{ and}$$

$$\|\overrightarrow{WSP_D}\| = \frac{c(t_{CD} - t_{DC})}{(t_{CD} + t_{DC})\sin(\beta + \gamma)}$$

with:
   $t_{DA}$ an acoustic propagation duration of an acoustic signal transmitted from the first acoustic node to the second acoustic node;
   $t_{AD}$ an acoustic propagation duration of an acoustic signal transmitted from the second acoustic node to the first acoustic node;
   $t_{DC}$ an acoustic propagation duration of an acoustic signal transmitted from the first acoustic node to the third acoustic node;
   $t_{CD}$ an acoustic propagation duration of an acoustic signal transmitted from the third acoustic nodes to the first acoustic node;
   c said value of the underwater acoustic sound velocity;
   $\alpha$ the direction of the first axis, per comparison to a reference axis;
   $\beta$ the direction of the second axis, per comparison to the reference axis.

Thus, the computing is easy to carry out.
According to a particular feature, step b comprises estimating the direction $\alpha$ of the first axis and the direction $\beta$ of the second axis, according to the following formulas:

$$\alpha = \cos^{-1}\left(\frac{d_{DH}}{t_{DA}*c}\right) \text{ and } \beta = \cos^{-1}\left(\frac{d_{DH}}{t_{DC}*c}\right)$$

with $d_{DH}$ a distance between the first acoustic node and a point H defined as an orthogonal projection of said first acoustic node on said first acoustic linear antenna.

In this case, the directions of the N axes are easily computed.

According to a particular feature, steps a) and b) are iterated:
  with said second and third acoustic nodes, in order to obtain a first value of the amplitude and a first value of the orientation angle, per comparison to the axis of said first acoustic linear antenna, of the water speed; and
  at least once, with another couple of acoustic nodes arranged along said first acoustic linear antenna and comprising at least one acoustic nodes different from said second and third acoustic nodes, in order to obtain at least one second value of the amplitude and at least one second value of the orientation angle, per comparison to the axis of said first acoustic linear antenna, of the water speed;
and the method comprises a further step of:
c) obtaining a final value of the amplitude as a function of the first value and the at least one second value of the amplitude, and obtaining a final value of the orientation angle as a function of the first value and the at least one second value of the orientation angle.

This redundancy makes the method more precise and robust to one or several acoustic nodes breakdown.

According to a particular feature, steps a) and b) are iterated:
  with said second and third acoustic nodes A and C; and
  with another couple of fourth and fifth acoustic nodes A' and C', arranged along a second acoustic linear antenna;
and the method comprises a further step of solving the following system of four equations, in order to obtain the estimated amplitude $\|\overrightarrow{WSP_D}\|$, the estimated orientation angle γ per comparison to the axis of said first acoustic linear antenna, and an estimated orientation angle γ' per comparison to the axis of said second acoustic linear antenna, of the water speed:

$$\|\overrightarrow{WSP_D}\| = \frac{c(t_{DA} - t_{AD})}{(t_{DA} + t_{AD})\sin(\alpha + \gamma)},$$

$$\|\overrightarrow{WSP_D}\| = \frac{c(t_{CD} - t_{DC})}{(t_{CD} + t_{DC})\sin(\beta + \gamma)},$$

$$\|\overrightarrow{WSP_D}\| = \frac{c(t_{DA'} - t_{A'D})}{(t_{DA'} + t_{A'D})\sin(\alpha' + \gamma')},$$

$$\|\overrightarrow{WSP_D}\| = \frac{c(t_{C'D} - t_{DC'})}{(t_{C'D} + t_{DC'})\sin(\beta' + \gamma')}$$

This redundancy makes the method more precise and robust to one or several acoustic nodes breakdown.

In a first implementation, said first acoustic node D is comprised in one of said acoustic linear antennas.

In a second implementation, said first acoustic node D is comprised in a paravane which is adjacent or not to one of said acoustic linear antennas.

According to a particular feature, the method is implemented in a master controller system, which manages an acoustic positioning system comprising said acoustic nodes, or in a navigation system, onboard a vessel which tows said acoustic linear antennas.

According to a particular feature, the method comprises a step of using at least one of said N−1 orientation angle(s) of the water speed, to carry out at least one action belonging to the group comprising:
  acoustic linear antenna distortion estimation;
  acoustic linear antenna cross-flow estimation;
  acoustic linear antenna network shape management;
  build of a water speed map along an acoustic linear antenna network.

In another embodiment, the invention pertains to a computer program product comprising program code instructions for implementing the above-mentioned method (in any of its different embodiments) when said program is executed on a computer or a processor.

In another embodiment, the invention pertains to a non-transitory computer-readable carrier medium, storing a program which, when executed by a computer or a processor causes the computer or the processor to carry out the above-mentioned method (in any of its different embodiments).

In another embodiment, the invention proposes a device for estimating the water speed of a first acoustic node D belonging to a network of acoustic nodes, at least some of said acoustic nodes being arranged along towed acoustic linear antennas. This device for estimating the water speed comprises:
  means for defining a N-dimensional base, the center of which is said first acoustic node and comprising a single axis, when N=1, or N non-collinear axes, when N=2 or N=3, each said axis being associated with a base vector extending from said first acoustic node to another acoustic node;
  means for estimating an amplitude of the water speed, as a function of:
    for each given other acoustic node defining a said base vector: an acoustic propagation duration of an acoustic signal transmitted from the first acoustic node to the given other acoustic node, and an acoustic propagation duration of an acoustic signal transmitted from the given other acoustic nodes to the first acoustic node;
    a value c of the underwater acoustic sound velocity.

According to a particular feature, when N=2 or N=3, the device for estimating the water speed comprises:
  means (61-63) for obtaining the direction of each of the N axes;
  means (61-63) for estimating the amplitude and N−1 orientation angle(s) of the water speed, as a function of:
    the directions of the N axes; and
    for each of the N axes, the estimated amplitude of the projection of the water speed on said axis.

Advantageously, the device comprises means for implementing the steps it performs in the method for estimating as described above, in any of its various embodiments.

4. LIST OF FIGURES

Other features and advantages of embodiments of the invention shall appear from the following description, given by way of an indicative and non-exhaustive examples and from the appended drawings, of which:

FIG. 1, already described with reference to the prior art, presents an example of network of seismic streamers towed by a seismic vessel;

5. DETAILED DESCRIPTION

In all of the figures of the present document, identical elements and steps are designated by the same alphanumerical reference sign.

Figure 1:
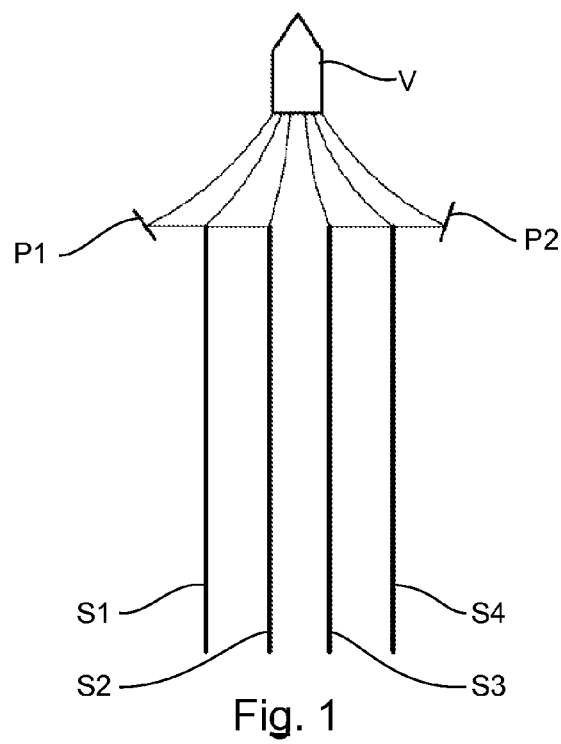
Figure 2:
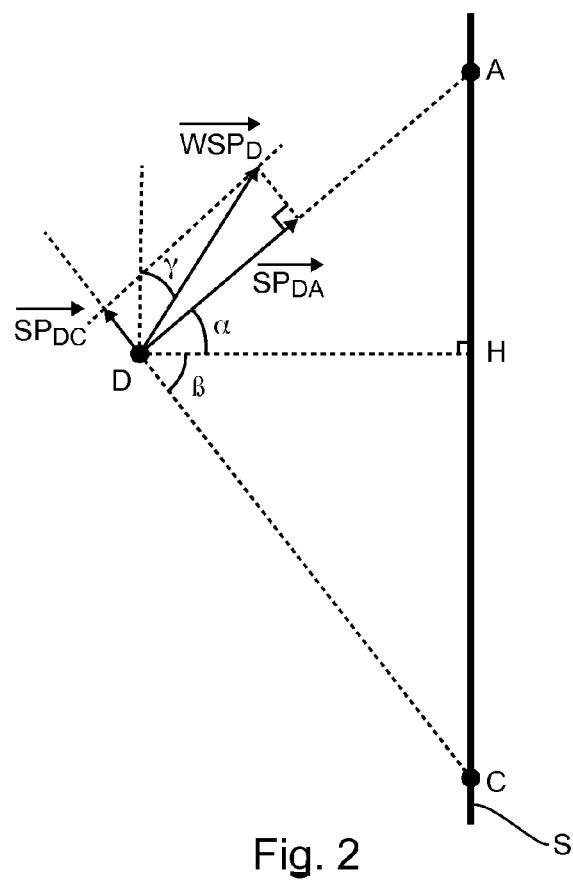
FIG. 2 illustrates the general principle of a method for estimating water speed, according to a first embodiment of the invention.

We present now, with FIG. 2, the general principle of a method for estimating water speed, according to a first embodiment of the invention.

As detailed below, the general principle of the method according to an embodiment of the invention is to use the results of the acoustic positioning system (i.e. the acoustic nodes), in order to estimate the amplitude and also, in particular embodiments, the direction of the water speed of a given node (referred to below as "node D") which is comprised in a streamer (e.g. an outer streamer close to the paravane), in order to estimate the streamer's water speed, or in a paravane, in order to estimate the paravane's water speed. It must be noted that in an alternative embodiment, the paravane's water speed is estimated by the water speed of a node D which is not comprised in the paravane itself but in a streamer, and is close to the paravane (e.g. the node D is the closest acoustic node, relative to the paravane, among the acoustic nodes arranged along the streamers).

This method benefits from the fact that, due to the low acoustic speed of sound in water (~1500 m/s), then an acoustic signal (also referred to as "acoustic range") is highly affected by the component of the water speed which is in the signal direction. The paravane's water speed or streamer's water speed are induced by the sea current and the vessel speed.

FIG. 2 represents a part of a streamer network. A, C and D are acoustic nodes (also referred to as "acoustic modules") which integrate acoustic positioning means, with nodes A and C on a same streamer S, in this example. $\overrightarrow{WSP_D}$ is the water speed at the node D. It forms an angle γ (also referred to as "orientation angle") with the streamer direction (AC).

In other words, we define a two-dimensional base, the center of which is node D and comprising two non-collinear axes (DA) and (DC). Each of these two non-collinear axes is associated with a distinct base vector: $\overrightarrow{DA}$ and $\overrightarrow{DC}$ respectively.

If nodes A, C and D are in the same plan, then the norm and direction of the vector $\overrightarrow{WSP_D}$ (in the ACD plan) can be estimated if it is projected on the two non-collinear axes (DA) and (DC) and if the projections are known in norm and direction.

The water speed affecting the acoustic signal which is propagating from A to D and the acoustic signal which is propagating from D to A, is the projection of the vector $\overrightarrow{WSP_D}$ on the axis (DA). This vector is called $\overrightarrow{SP_{DA}}$, his norm is $\|\overrightarrow{SP_{DA}}\|$ and it forms an angle α with the segment [DH] which is orthogonal to the streamer.

Below is described the computation of α:

$$\alpha = \cos^{-1}\left(\frac{d_{DH}}{d_{DA}}\right)$$

With:

$d_{DA} = t_{DA} \cdot c$ $t_{DA}$ is the acoustic propagation time between nodes D and A, measured by the acoustic positioning mean (comprised in node A for example, if the acoustic signal is transmitted from node D to node A)

c is the sound velocity $d_{DH}$ is the crossline separation.

In an alternative embodiment, α is an input parameter (e.g. a predetermined value or a value provided by the navigation system which deduces this value from the layout of the acoustic nodes network).

We explain now how the cross-line distance $d_{HD}$ can be computed if the length of the sides of the triangle DAC are known. We note the lengths of the sides as follows: $d_{AC}=d$, $d_{CD}=a$, $d_{AD}=b$ and h the length of the altitude HD. By Heron's formula, the area of this triangle is:

$$Aera_{DAC} = \sqrt{s(s-a)(s-b)(s-d)}$$

where $$s = \frac{1}{2}(a+b+d)$$

is half of the triangle's perimeter.

But the area of a triangle can also be written with the well-known formula:

$$Aera_{DAC} = \frac{d \cdot h}{2}$$

where h (also noted $d_{HD}$) is the altitude having the foot H and passing through the vertex D, and d is the length of the base AC of the triangle DAC.

From these two above formulas for calculating area of the triangle DAC, we obtain the following:

$$s(s-a)(s-b)(s-d) = \frac{d^2 h^2}{4}$$

which, after simplifying, leads to the following formula (I):

$$d_{HD}^2 = h^2 = -\frac{(a+b+d)(a+b-d)(a-b-d)(a-b+d)}{4c^2} \quad (I)$$

Below is described the computation of $\|\overrightarrow{SP_{DA}}\|$:
We have:

$$t_{DA} = \frac{d_{DA}}{c}\left(1 + \frac{\|\overrightarrow{SP_{DA}}\|}{c}\right) \text{ and } t_{AD} = \frac{d_{DA}}{c}\left(1 - \frac{\|\overrightarrow{SP_{DA}}\|}{c}\right)$$

So:

$$t_{DA} + t_{AD} = \frac{d_{DA}}{c}$$

$$t_{DA} - t_{AD} = \frac{2\|\overrightarrow{SP_{DA}}\|}{c}\frac{d_{DA}}{c} = \frac{2\|\overrightarrow{SP_{DA}}\|}{c}(t_{DA} + t_{AD})$$

Consequently:

$$\|\overrightarrow{SP_{DA}}\| = \frac{c(t_{DA} - t_{AD})}{t_{DA} + t_{AD}}$$

We have demonstrated that the projection of the vector $\overrightarrow{WSP_D}$ on the axis (DA) is completely known, in amplitude and direction.

In the same manner, we can demonstrate that the projection of the vector $\overrightarrow{WSP_D}$ on the axis (DC) is completely known, in amplitude and direction. The water speed affecting the acoustic signal which is propagating from C to D and the acoustic signal which is propagating from D to C, is the projection of the vector $\overrightarrow{WSP_D}$ on the axis (DC). This vector is called $\overrightarrow{SP_{DC}}$, his norm is $\|\overrightarrow{SP_{DC}}\|$ and it forms an angle β with the segment [DH] which is orthogonal to the streamer.

Below is described the computation of β:

$$\beta = \cos^{-1}\left(\frac{d_{DH}}{d_{DC}}\right)$$

With:
$d_{DC} = t_{DC} \cdot c$
$t_{DC}$ is the acoustic propagation time between nodes D and C, measured by the acoustic positioning mean (comprised in node C for example, if the acoustic signal is transmitted from node D to node C)
c is the sound velocity
$d_{DH}$ is the crossline separation.

In an alternative embodiment, β is an input parameter (e.g. a predetermined value or a value provided by the navigation system which deduces this value from the layout of the acoustic nodes network).

We have also:

$$\|\overrightarrow{SP_{DC}}\| = \frac{c(t_{DC} - t_{CD})}{t_{DC} + t_{CD}}$$

Below is described the computation of $\|\overrightarrow{WSP_D}\|$, using the above computation of $\|\overrightarrow{SP_{DA}}\|$:

$$\|\overrightarrow{WSP_D}\| = \frac{\|\overrightarrow{SP_{DA}}\|}{\cos\left(\frac{\pi}{2} - \alpha - \gamma\right)}$$

We obtain the following equation (II):

$$\|\overrightarrow{WSP_D}\| = \frac{c(t_{DA} - t_{AD})}{(t_{DA} + t_{AD})\sin(\alpha + \gamma)}$$

With the same method applied on the axis (DC), we obtain the following equation (III):

$$\|\overrightarrow{WSP_D}\| = \frac{c(t_{CD} - t_{DC})}{(t_{CD} + t_{DC})\sin(\beta + \gamma)}$$

As detailed above, the angles α and β can be determined with $t_{DA}$, $t_{DC}$, if the sound speed c and the distance $d_{AC}$ are known.

Then we have two equations (II) and (III) at two unknowns, $\|\overrightarrow{WSP_D}\|$ and γ, which are possible to figure out.

If more than two nodes of the streamer S (i.e. if there are other nodes than nodes A and C) which can exchange acoustic signals with node D, then the accuracy of the water speed estimation can be increased. For example, a final value of $\|\overrightarrow{WSP_D}\|$ and a final value of γ can be computed using a least square algorithm having as inputs all the estimated values of the norm (amplitude) and the direction of the water speed. Indeed, when the method described above is used with the couple of nodes A and C, it gives a first value of $\|\overrightarrow{WSP_D}\|$ and a first value of γ. If the method described above is used with one or several other couples of nodes, it gives for each other couple of nodes another value of $\|\overrightarrow{WSP_D}\|$ and another value of γ. Two couples of nodes are different if at least one node is different (e.g. couple (A,D) is different from couple (A,B)).

Figure 3:
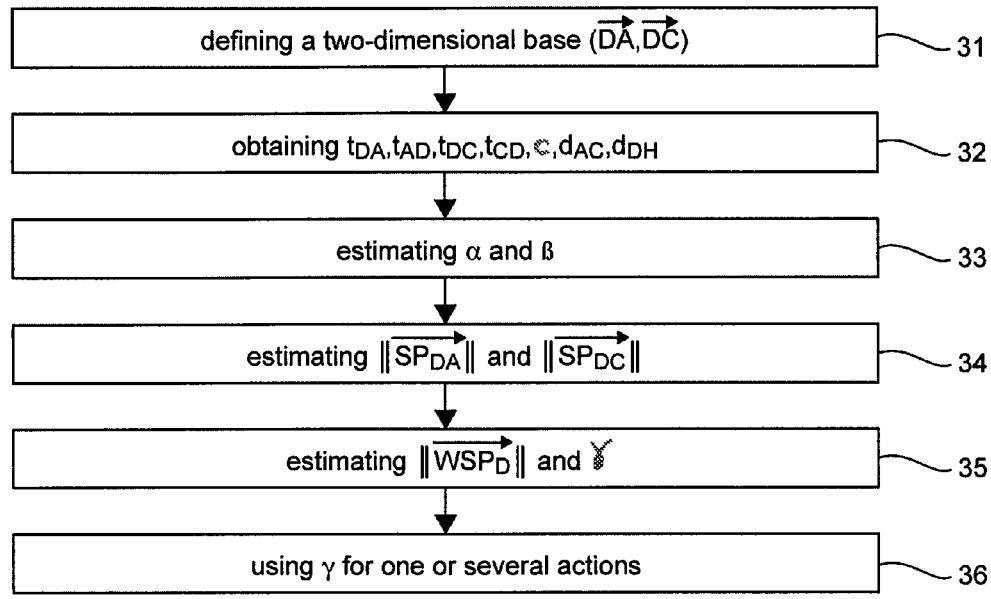
FIG. 3 is a flowchart of a particular embodiment of the method for estimating water speed, according to the first embodiment illustrated in FIG. 2.

FIG. 3 is a flowchart of a particular embodiment of the method for estimating water speed, according to the first embodiment illustrated in FIG. 2.

This method can be implemented on the master controller system, which manages the acoustic positioning system, or on the navigation system (onboard the vessel which tows the streamers), which positions in real time and in the Earth's reference the streamers.

In a step 31, we define the two-dimensional base ($\overrightarrow{DA}$, $\overrightarrow{DC}$).

In a step 32, we obtain $t_{DA}$, $t_{AD}$, $t_{DC}$, $t_{CD}$, c, $d_{AC}$ and $d_{DH}$ (see above formulas).

In a step 33, we estimate the angles α and β (see above formulas).

In a step 34, we estimate $\overrightarrow{SP_{DA}}$ and $\overrightarrow{SP_{DC}}$ (see above formulas).

In a step 35, we estimate $\|\overrightarrow{WSP_D}\|$ and γ (see above system of equations (II) and (III)).

This method has several advantages, notably:
- no need for a specific and dedicated equipment to estimate the water-speed of a device (in particular a streamer or a paravane) which includes the node D or is close to the node D;
- no maintenance of such a specific and dedicated equipment (speedlog equipment), i.e. no maintenance relating to battery, calibration, clean of sensor, trapping fishing nets . . . ;

deployment and recovery time not increased by the installation of a dedicated equipment;

robust to one or several acoustic nodes breakdown;

water speed on the whole spread (i.e. in any point of the streamer network).

In a particular embodiment, the information of direction γ is used for at least one of the following actions (operations): streamer distortion estimation, streamer cross-flow estimation, streamer network shape management, build of a water speed map along a streamer network (which permits to increase the streamer shape estimations), etc.

Figure 4:
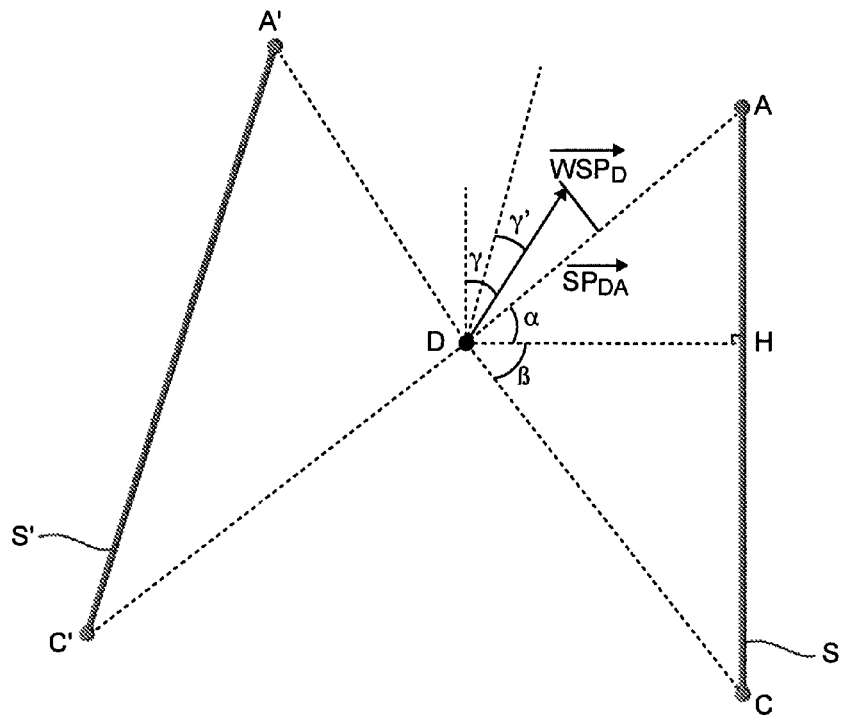
FIG. 4 illustrates the general principle of a method for estimating water speed, according to a second embodiment of the invention.

FIG. 4 illustrates the general principle of a method for estimating water speed, according to a second embodiment of the invention.

In this second embodiment, the method described above in relation with FIGS. 2 and 3 is used twice: once with the couple of nodes A and C, and once with another couple of nodes A' and C' arranged another streamer S'.

Then we have the following system of four equations:

$$\|\overrightarrow{WSP_D}\| = \frac{c(t_{DA} - t_{AD})}{(t_{DA} + t_{AD})\sin(\alpha + \gamma)},$$

$$\|\overrightarrow{WSP_D}\| = \frac{c(t_{CD} - t_{DC})}{(t_{CD} + t_{DC})\sin(\beta + \gamma)},$$

$$\|\overrightarrow{WSP_D}\| = \frac{c(t_{DA'} - t_{A'D})}{(t_{DA'} + t_{A'D})\sin(\alpha' + \gamma')},$$

$$\|\overrightarrow{WSP_D}\| = \frac{c(t_{C'D} - t_{DC'})}{(t_{C'D} + t_{DC'})\sin(\beta' + \gamma')}$$

This system of four equations has three unknowns $\|\overrightarrow{WSP_D}\|$, γ and γ', which are therefore possible to figure out with:

γ the $\overrightarrow{WSP_D}$ direction per comparison to the streamer S, and

γ' the $\overrightarrow{WSP_D}$ direction per comparison to the other streamer S'.

Figure 5:
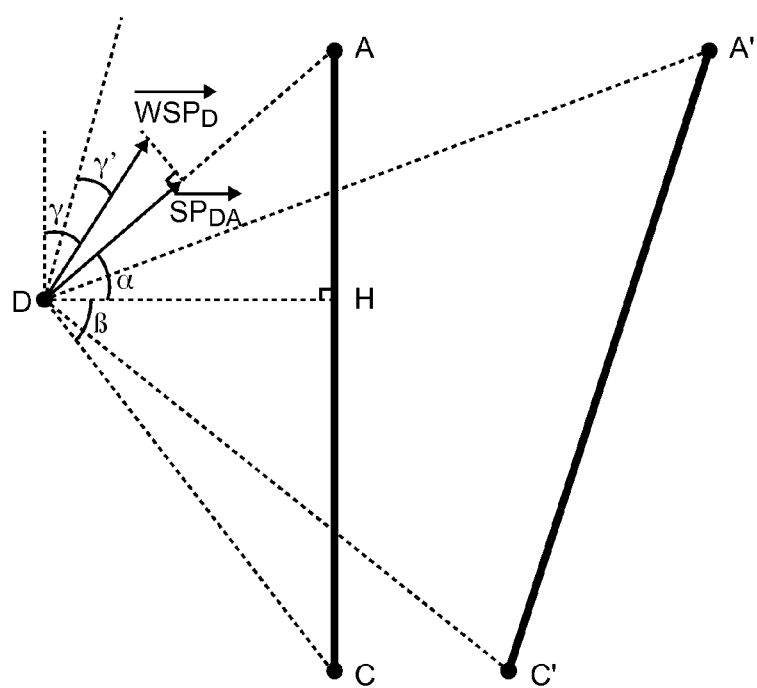
FIG. 5 illustrates the general principle of a method for estimating water speed, according to a third embodiment of the invention.

FIG. 5 illustrates the general principle of a method for estimating water speed, according to a third embodiment of the invention. This third embodiment differs from the second one only in that the node D is between the streamers S and S' (i.e. between (AC) and (A'C')) in FIG. 4, and is not in FIG. 5.

It is important to note that the proposed method, described above with example embodiments (see FIGS. 2-5), can be extrapolated to the use of any number of couples of nodes, in the same streamers or in different streamers (which are adjacent or not). The only constraint to respect is to be able to know (compute) the relative direction of each axis (between the node D and a node of a couple of nodes) used for the water speed estimation.

In an alternative embodiment, the method is used with a one-dimensional base (i.e. N=1): the acoustic node D is used with only one other acoustic node (e.g. node A). In that case, only the projection of the vector $\overrightarrow{WSP_D}$ on the axis (DA) can be computed. As already mentioned above, this vector is called $\overrightarrow{SP_{DA}}$. The direction of the water speed can not be estimated.

The proposed method, described above with example embodiments (see FIGS. 2-5) with a 2-dimensional base, can easily be extrapolated by the Man skilled in the art to a 3-dimensional base. Indeed, if three non-collinear axes are used (node D being the center of the base), and if these three axes are not in the same plan, then the water speed vector can be known in a 3-dimensional space.

Higher is the number of couple of nodes used in order to estimate the water speed, better is the accuracy of the estimation. We have not detailed in the present text how is solved an oversized system or how is filtered in time the noise on the measures, but there are many conventional ways to do it. If the system is oversized, then when one or several acoustic modules are down the method still works but the measure's accuracy is decreased.

The shape of the N-dimensional base (2-dimensional or more) formed in order to determine the amplitude and the direction of the water speed has an impact on the performances.

If the 2-dimensional base is orthonormal, i.e. orthogonal and normalized, then the performances will be the same whatever is the water speed direction.

If the base is orthonormal but if one base vector is greater than another, then a same error on the propagation time forming the base vectors will less affect the water speed measurement in the direction of the large vector. So it is beneficial to have one of the base vectors in the main water-speed direction. In the case described above, the water speed is mainly generated by the vessel speed, so it is beneficial that one of the base vectors is inline to the streamer (for example, nodes D and A are on a same streamer and node C is on another streamer).

The base can be not-orthogonal, like in the embodiments of FIGS. 2, 4 and 5. In that case, the goal is to optimize the performances of the inline water-speed measurement in place of the crossline value ("inline" referred to "parallel to streamer" and "crossline" referred to "perpendicular to streamer"). So the two base vectors which form the base are closed to inline acoustic ranges, which offer redundancy. Indeed, when the two base vectors are not orthogonal, there is a correlation between the projections of the $\overrightarrow{WSP_D}$ vector on each of the base vectors of the base, which provides redundancy information. This embodiment is compatible to acoustic positioning system for which inline ranges aren't available.

The method is tolerant to a V-shape between the streamers from which acoustic ranges are used and to a feather angle of the streamers.

Figure 6:
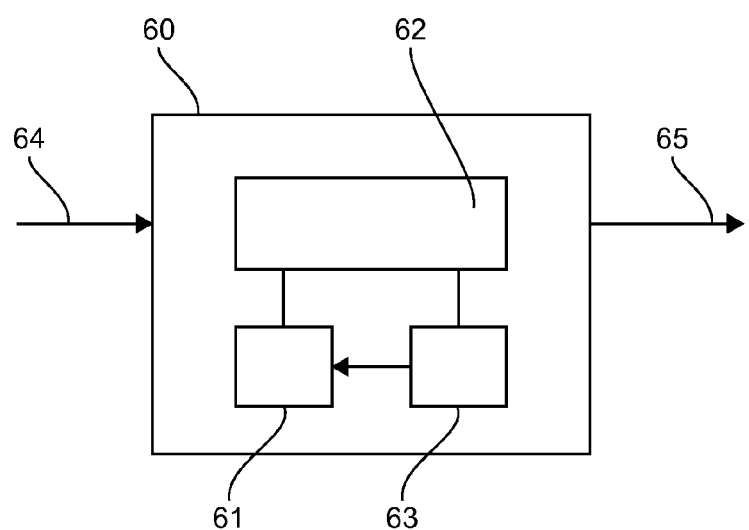
FIG. 6 shows the simplified structure of a device for estimating water speed, according to a particular embodiment of the invention.

Now referring to FIG. 6, we present the simplified structure of a device (e.g. a master controller system or a navigation system) for estimating water speed, according to a particular embodiment of the invention.

The estimation device 60 comprises a read-only memory (ROM) 63, a random access memory (RAM) 61 and a processor 62. The read-only memory 63 (non transitory computer-readable carrier medium) stores executable program code instructions, which are executed by the processor 62 in order to enable implementation of the technique of an embodiment of the invention (e.g. the steps 31 to 36 of FIG. 3).

Upon initialization, the aforementioned program code instructions are transferred from the read-only memory 63 to the random access memory 61 so as to be executed by the processor 62. The random access memory 61 likewise includes registers for storing the variables and parameters required for this execution. The processor 32 receives, as inputs 64, the following information:

acoustic propagation times (in the example of FIGS. 2 and 3: $t_{DA}$, $t_{AD}$, $t_{DC}$, $t_{CD}$);

known inter-node distances (in the example of FIGS. 2 and 3: $d_{AC}$);

a measured value c of the underwater acoustic sound velocity. In an alternative embodiment, this value is estimated (see Patent Application EP 11305835.8).

According to the program code instructions, the processor 62 delivers, as outputs 65, an estimated value of the norm $\|\overrightarrow{WSP_D}\|$ and the direction γ of the water speed.

All the steps of the above estimation method can be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

At least one embodiment of the present disclosure provides a technique for estimating the water speed of a device (streamer, paravane, or any other device), which does not require any specific measure equipment and allows to reduce the general maintenance plan and to win time during deployment and recovery.

At least one embodiment provides a technique of this kind, that gives a direction measurement of the water speed which allows notably (but not exclusively) to improve the streamer distortion estimating, which finally improve the streamer network geometry management.

At least one embodiment provides a technique of this kind that is simple to implement and costs little.

The invention claimed is:

1. A method comprising:
   estimating the water speed of a first acoustic node D belonging to a network of acoustic nodes, at least some of said acoustic nodes being arranged along towed acoustic linear antennas, wherein said estimating comprises the following acts performed by a master controller of the network of acoustic nodes or by a navigation system, which is connected to the network of acoustic nodes:
   a) defining a two-dimensional base, the center of which is said first acoustic node and comprising two non-colinear axes, each said axis being associated with a base vector extending from said first acoustic node to another acoustic node; and
   b) estimating an amplitude of the water speed, as a function of:
      for each given other acoustic node defining said base vector: an acoustic propagation duration of an acoustic signal transmitted from the first acoustic node to the given other acoustic node, and an acoustic propagation duration of an acoustic signal transmitted from the given other acoustic node to the first acoustic node; and
      a value c of the underwater acoustic sound velocity,
   wherein act a) comprises defining a two-dimensional base comprising first and second non-colinear axes, the first axis being associated with a first base vector extending from said first acoustic node to a second acoustic node A, the second axis being associated with a second base vector extending from said first acoustic node to a third acoustic node C, the second and third acoustic nodes being arranged along a first acoustic linear antenna, and wherein act b) comprises estimating, in a plan comprising the first, second and third acoustic nodes, an amplitude $\|\overrightarrow{WSP_D}\|$ and an orientation angle γ of the first and second base vectors as compared to an axis of said first acoustic linear antenna, of the water speed, by solving the following system of two equations:

$$\|\overrightarrow{WSP_D}\| = \frac{c(t_{DA} - t_{AD})}{(t_{DA} + t_{AD})\sin(\alpha + \gamma)} \text{ and}$$

$$\|\overrightarrow{WSP_D}\| = \frac{c(t_{CD} - t_{DC})}{(t_{CD} + t_{DC})\sin(\beta + \gamma)}$$

with
   tDA being an acoustic propagation duration of an acoustic signal transmitted from the first acoustic node to the second acoustic node;
   tAD being an acoustic propagation duration of an acoustic signal transmitted from the second acoustic node to the first acoustic node;
   tDC being an acoustic propagation duration of an acoustic signal transmitted from the first acoustic node to the third acoustic node;
   tCD being an acoustic propagation duration of an acoustic signal transmitted from the third acoustic nodes to the first acoustic node;
   c being said value of the underwater acoustic sound velocity;
   α being the direction of the first axis, as compared to a reference axis; and
   β being the direction of the second axis, as compared to the reference axis.

2. The method according to claim 1, wherein, for each said axis associated with said base vector extending from said first acoustic node D, to another acoustic node, generically noted X, act b) comprises estimating an amplitude $\|\overrightarrow{SP_{DX}}\|$ of a projection of the water speed on said axis, as a function of:
   an acoustic propagation duration $t_{DX}$ of an acoustic signal transmitted from the first acoustic node D to the other acoustic node X;
   an acoustic propagation duration txr, of an acoustic signal transmitted from the other acoustic node X to the first acoustic node D; and
   said value c of the underwater acoustic sound velocity.

3. The method according to claim 2, wherein the amplitude $\|\overrightarrow{SP_{DX}}\|$ is estimated according to the following formula:

$$\|\overrightarrow{SP_{DX}}\| = \frac{c(t_{DX} - t_{XD})}{t_{DX} + t_{XD}}.$$

4. The method according to claim 1, wherein step b comprises estimating the direction α of the first axis and the direction β of the second axis, according to the following formulas:

$$\alpha = \cos^{-1}\left(\frac{d_{DH}}{t_{DA} * c}\right) \text{ and } \beta = \cos^{-1}\left(\frac{d_{DH}}{t_{DC} * c}\right)$$

with $d_{DH}$ a distance between the first acoustic node and a point H defined as an orthogonal projection of said first acoustic node on said first acoustic linear antenna.

5. The method according to claim 1, wherein steps a) and b) are iterated:
   with said second and third acoustic nodes, in order to obtain a first value of the amplitude and a first value of the orientation angle, per comparison to the axis of said first acoustic linear antenna, of the water speed; and
   at least once, with another couple of acoustic nodes arranged along said first acoustic linear antenna and comprising at least one acoustic nodes different from said second and third acoustic nodes, in order to obtain at least one second value of the amplitude and at least one second value of the orientation angle, per comparison to the axis of said first acoustic linear antenna, of the water speed;
and wherein said method comprises a further act of:
c) obtaining a final value of the amplitude as a function of the first value and the at least one second value of the amplitude, and obtaining a final value of the orientation angle as a function of the first value and the at least one second value of the orientation angle.

6. The method according to claim 1, wherein steps a) and b) are iterated:
   with said second and third acoustic nodes A and C; and
   with another couple of fourth and fifth acoustic nodes A' and C', arranged along a second acoustic linear antenna;
and wherein said method comprises a further act of solving the following system of four equations, in order to obtain the estimated amplitude $\|\overrightarrow{WSP_D}\|$, the estimated orientation angle $\gamma$ per comparison to the axis of said first acoustic linear antenna, and an estimated orientation angle $\gamma'$ per comparison to the axis of said second acoustic linear antenna, of the water speed:

$$\|\overrightarrow{WSP_D}\| = \frac{c(t_{DA} - t_{AD})}{(t_{DA} + t_{AD})\sin(\alpha + \gamma)},$$

$$\|\overrightarrow{WSP_D}\| = \frac{c(t_{CD} - t_{DC})}{(t_{CD} + t_{DC})\sin(\beta + \gamma)},$$

$$\|\overrightarrow{WSP_D}\| = \frac{c(t_{DA'} - t_{A'D})}{(t_{DA'} + t_{A'D})\sin(\alpha' + \gamma')},$$

$$\|\overrightarrow{WSP_D}\| = \frac{c(t_{C'D} - t_{DC'})}{(t_{C'D} + t_{DC'})\sin(\beta' + \gamma')}.$$

7. The method according to claim 1, wherein said first acoustic node D is comprised in one of said acoustic linear antennas.

8. The method according to claim 1, wherein said first acoustic node D is comprised in a paravane which is adjacent or not to one of said acoustic linear antennas.

9. The method according to claim 1, wherein said method is implemented in a master controller system, which manages an acoustic positioning system comprising said acoustic nodes, or in a navigation system, onboard a vessel which tows said acoustic linear antennas.

10. The method according to claim 1, wherein said method comprises an act of using said orientation angle of the water speed, to navigate the towed acoustic linear antennas.

11. The method according to claim 1, comprising, for each given other acoustic node defining said base vector: transmitting the acoustic signal from the first acoustic node to the given other acoustic node, and receiving the acoustic signal transmitted from the given other acoustic node to the first acoustic node.

12. The method according to claim 1, comprising towing said acoustic linear antennas by a vessel.

13. A non-transitory computer-readable carrier medium storing a program which, when executed by a computer or a processor of a master controller of a network of acoustic nodes or of a navigation system, which is connected to the network of acoustic nodes, causes the computer or the processor to carry out a method comprising acts of:
   estimating water speed of a first acoustic node D belonging to the network of acoustic nodes, at least some of said acoustic nodes being arranged along towed acoustic linear antennas, wherein said estimating comprises:
   a) defining a two-dimensional base, the center of which is said first acoustic node and comprising two non-colinear and non-orthogonal axes, each said axis being associated with a base vector extending from said first acoustic node to another acoustic node; and
   b) estimating an amplitude of the water speed, as a function of:
      for each given other acoustic node defining said base vector: an acoustic propagation duration of an acoustic signal transmitted from the first acoustic node to the given other acoustic node, and an acoustic propagation duration of an acoustic signal transmitted from the given other acoustic node to the first acoustic node; and
      a value c of the underwater acoustic sound velocity,
   wherein act a) comprises defining a two-dimensional base comprising first and second non-colinear axes, the first axis being associated with a first base vector extending from said first acoustic node to a second acoustic node A, the second axis being associated with a second base vector extending from said first acoustic node to a third acoustic node C, the second and third acoustic nodes being arranged along a first acoustic linear antenna, and wherein act b) comprises estimating, in a plan comprising the first, second and third acoustic nodes, an amplitude $\|\overrightarrow{WSP_D}\|$ and an orientation angle $\gamma$ of the first and second base vectors as compared to an axis of said first acoustic linear antenna, of the water speed, by solving the following system of two equations:

$$\|\overrightarrow{WSP_D}\| = \frac{c(t_{DA} - t_{AD})}{(t_{DA} + t_{AD})\sin(\alpha + \gamma)} \text{ and}$$

$$\|\overrightarrow{WSP_D}\| = \frac{c(t_{CD} - t_{DC})}{(t_{CD} + t_{DC})\sin(\beta + \gamma)}$$

with:
   tDA being an acoustic propagation duration of an acoustic signal transmitted from the first acoustic node to the second acoustic node;
   tAD being an acoustic propagation duration of an acoustic signal transmitted from the second acoustic node to the first acoustic node;
   tDC being an acoustic propagation duration of an acoustic signal transmitted from the first acoustic node to the third acoustic node;
   tCD being an acoustic propagation duration of an acoustic signal transmitted from the third acoustic nodes to the first acoustic node;
   c being said value of the underwater acoustic sound velocity;
   $\alpha$ being the direction of the first axis, as compared to a reference axis; and
   $\beta$ being the direction of the second axis, as compared to the reference axis.

14. The non-transitory computer-readable carrier medium according to claim 13, wherein the program further causes the computer or the processor to carry out acts of: for each given other acoustic node defining said base vector: transmitting the acoustic signal from the first acoustic node to the given other acoustic node, and receiving the acoustic signal transmitted from the given other acoustic node to the first acoustic node.

15. A device for estimating the water speed of a first acoustic node D, wherein said device comprises:
    means for defining a two-dimensional base, the center of which is said first acoustic node and comprising two non-colinear and non-orthogonal axes, each said axis being associated with a base vector extending from said first acoustic node to another acoustic node; and
    means for estimating an amplitude of the water speed of the first acoustic node, which belongs to a network of acoustic nodes, at least some of said acoustic nodes being arranged along towed acoustic linear antennas, wherein the amplitude is estimated as a function of:
        for each given other acoustic node defining said base vector: an acoustic propagation duration of an acoustic signal transmitted from the first acoustic node to the given other acoustic node, and an acoustic propagation duration of an acoustic signal transmitted from the given other acoustic node to the first acoustic node;
    a value c of the underwater acoustic sound velocity,
wherein said two-dimensional base comprising first and second non-colinear axes, the first axis being associated with a first base vector extending from said first acoustic node to a second acoustic node A, the second axis being associated with a second base vector extending from said first acoustic node to a third acoustic node C, the second and third acoustic nodes being arranged along a first acoustic linear antenna, and said means for estimating comprises means for estimating, in a plan comprising the first, second and third acoustic nodes, an amplitude $\|\overrightarrow{WSP_D}\|$ and an orientation angle $\gamma$ of the first and second base vectors as compared to an axis of said first acoustic linear antenna, of the water speed, by solving the following system of two equations:

$$\|\overrightarrow{WSP_D}\| = \frac{c(t_{DA} - t_{AD})}{(t_{DA} + t_{AD})\sin(\alpha + \gamma)} \text{ and}$$

$$\|\overrightarrow{WSP_D}\| = \frac{c(t_{CD} - t_{DC})}{(t_{CD} + t_{DC})\sin(\beta + \gamma)}$$

with:
    tDA being an acoustic propagation duration of an acoustic signal transmitted from the first acoustic node to the second acoustic node;
    tAD being an acoustic propagation duration of an acoustic signal transmitted from the second acoustic node to the first acoustic node;
    tDC being an acoustic propagation duration of an acoustic signal transmitted from the first acoustic node to the third acoustic node;
    tCD being an acoustic propagation duration of an acoustic signal transmitted from the third acoustic nodes to the first acoustic node;
    c being said value of the underwater acoustic sound velocity;
    $\alpha$ being the direction of the first axis, as compared to a reference axis; and
    $\beta$ being the direction of the second axis, as compared to the reference axis.

16. The device according to claim 15, further comprising: means for transmitting the acoustic signal from the first acoustic node to the given other acoustic node, and receiving the acoustic signal transmitted from the given other acoustic node to the first acoustic node, for each given other acoustic node defining said base vector.

* * * * *